E. O. GOORDMAN.
SELF GRIPPING MANDREL.
APPLICATION FILED AUG. 3, 1921.
Reissued June 20, 1922. 15,390.
Fig. 1.
Fig. 3
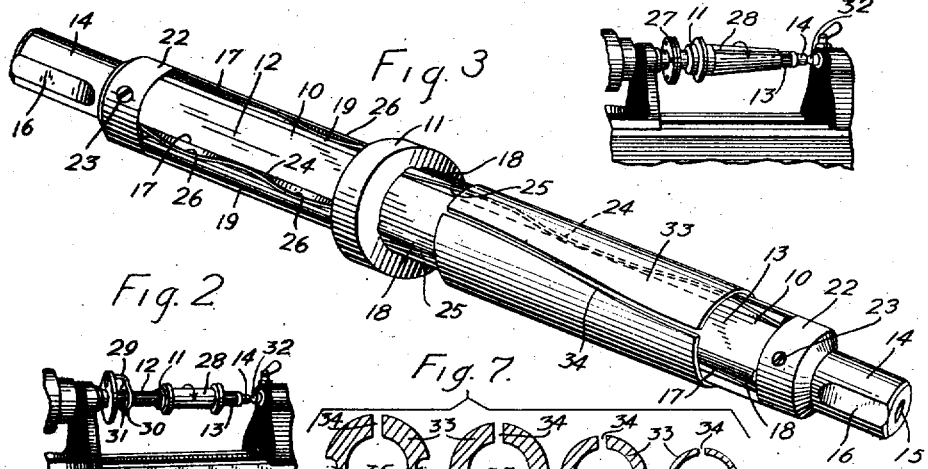
Fig. 2
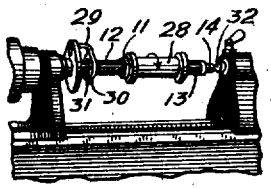
Fig. 7.
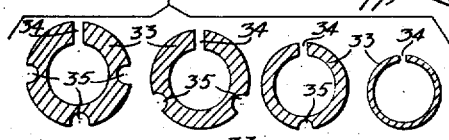
Fig. 4.
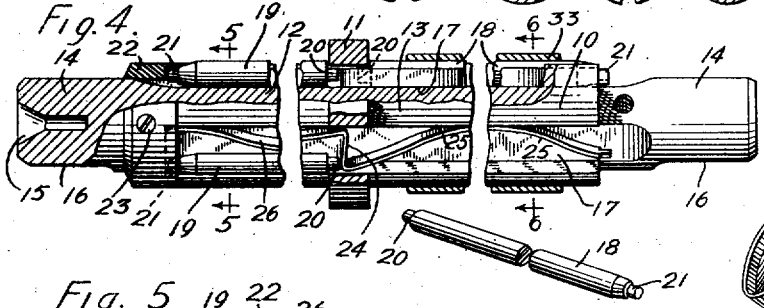
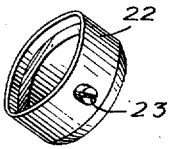
Fig. 5
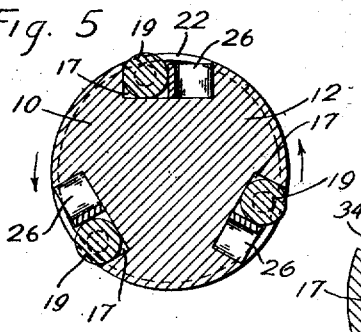
Fig. 6.
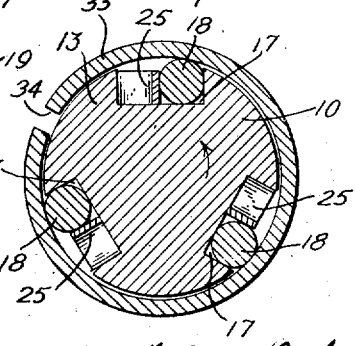
Inventor
Elmer O. Goordman
By Merwell & Spencer
Attorneys

UNITED STATES PATENT OFFICE.

ELMER O. GOORDMAN, OF NORGE, VIRGINIA, ASSIGNOR TO THE EFFICIENCY MACHINE TOOL PRODUCTS CO., OF BRIDGEPORT, CONNECTICUT, A CORPORATION OF CONNECTICUT.

SELF-GRIPPING MANDREL.

15,390. Specification of Reissued Letters Patent. Reissued June 20, 1922.

Original No. 1,323,855, dated December 2, 1919, Serial No. 301,466, filed June 3, 1919. Application for reissue filed August 3, 1921. Serial No. 489,634.

*To all whom it may concern:*

Be it known that I, ELMER O. GOORDMAN, a citizen of the United States, residing at Norge, county of James City, State of Virginia, have invented an Improvement in Self-Gripping Mandrels, of which the following is a specification.

This invention relates to work-holding mandrels or arbors for use in lathes and other machines for the purpose of supporting and imparting rotary movement to hollow work upon which the machine is to operate.

The invention has for its objects to provide an improved mandrel of this character having means for automatically gripping or forming a driving connection with the work, and preferably also with the lathe chuck or other driving element of the machine; to provide gripping means which will also operate automatically to center the mandrel in the machine, or to center the work on the mandrel, or both, with reliability and accuracy; to provide gripping means which will permit the application of the work to the mandrel, the insertion of the mandrel in the machine, or the removal of either mandrel or work by a simple and direct operation without the use of tools; and to provide gripping means which is of such a nature as readily to adapt the same mandrel to use with pieces of work of widely differing internal diameters.

The foregoing and other objects of the invention, together with means whereby the same may be carried into effect, will best be understood from the following description of one form or embodiment thereof illustrated in the accompanying drawings, in which:

Figure 1 is a perspective view of a portion of a lathe having a piece of work supported therein by means of a mandrel constructed in accordance with the invention, said mandrel being operatively connected with the driving element of the lathe by means of a chuck of familiar form.

Fig. 2 is a similar view showing the mandrel driven by the usual lathe dog.

Fig. 3 is an enlarged perspective view of the mandrel per se.

Fig. 4 is an elevation, partly broken away, of the mandrel, showing one of the gripping rollers and one of the retaining caps or collars removed.

Figs. 5 and 6 are enlarged sections on the lines 5—5 and 6—6 respectively, Fig. 4.

Fig. 7 is a view illustrating, in transverse section, a series of interchangeable sleeves employed to adapt the mandrel for use in connection with work of different internal diameters.

The body of the mandrel comprises a cylinder or shaft 10 having intermediate its ends a preferably integral collar 11 dividing said body into a driven portion 12 and a preferably longer driving portion 13. At the extremities of the body 10 the mandrel is provided with reduced terminals 14 having in their ends sockets or recesses 15 to receive the usual lathe centers, and preferably formed with flattened faces 16 to facilitate their connection with lathe dogs of the usual type.

The mandrel body 10 is provided with a plurality of grooves 17, preferably three in number, spaced at equal intervals about said body and extending substantially throughout the length thereof, said grooves passing under and being bridged by the collar 11. Located in the portions of the grooves 17 which are formed in the driving portion 13 of the mandrel are gripping rollers 18, while similarly located in the portions of said grooves which are formed in the driven portion 12 of the mandrel are similar gripping rollers 19. The gripping rollers 18 and 19 are formed with reduced inner ends 20 which are engaged beneath the collar 11, and with reduced outer ends 21 which are engaged by the annular flanges of removable end caps 22; said caps being slipped over the reduced terminals 14 of the mandrel and into engagement with the ends of the body portion 10 thereof, and being secured in place by set screws 23. Engagement of the collar 11 and caps 22 with the reduced end portions 20 and 21 of the rollers 18 and 19 serves to retain said rollers in position in the grooves 17, removal of said caps 22 permitting the disengagement of the ends 20 of the rollers from the collar 11 and the consequent removal of said rollers from the mandrel, as illustrated at the right in Fig. 4.

The grooves 17 are preferably substantially rectangular in cross section, being of equal depth at both sides, and the rollers 18 and 19 therein constitute intermittent or one way gripping devices for operatively connecting the mandrel body with a surrounding cylindrical member for rotation in unison therewith in one direction or the other, depending upon the position of said rollers at one side or the other of said gooves. The rollers 18 and 19 are normally held at opposite sides, respectively, of the grooves 17 by springs 24 located in said grooves, each of said springs being preferably continuous throughout the length of the corresponding groove, and each having a portion 25 cooperating with the roller 18 therein and a connected portion 26 cooperating with the corresponding roller 19, said portions 25 and 26 being bowed in opposite directions to hold said rollers in engagement with the opposite sides of said slots, as above explained.

As will now be apparent by reference to Figs. 5 and 6, the gripping rollers 18 and 19 are oppositely acting, the rollers 19 being adapted to transmit rotary motion in one direction from an outside source to the driven portion 12 of the mandrel, and the rollers 18 being adapted to transmit rotary motion in the same direction from the driving portion 13 of the mandrel to a cylindrical member placed thereon. For example, assuming that the work is to be rotated in a counter-clockwise direction, as indicated by the arrows on Figs. 5 and 6 (this being the normal direction of rotation in the operation of the ordinary lathe, as indicated by the arrows on Figs. 1 and 2), the driven portion 12 of the mandrel may be inserted into a suitable lathe chuck 27 (Fig. 1) of any suitable form but of an internal diameter substantially fitting the mandrel body, whereupon it will be seen that rotary motion of said chuck in a counter-clockwise direction will be transmitted to the mandrel through the rollers 19. If, prior to the insertion of the mandrel into the chuck, there be applied to the driving end 13 thereof a piece of hollow work 28 (Fig. 1) having an internal bore substantially fitting the mandrel, it will be seen that rotary movement of said mandrel in a counter-clockwise direction will be transmitted though the rollers 18 to said work. It will be seen that the mandrel may be readily placed in or removed from the chuck, and the work applied to or removed from the mandrel, by a simple operation not requiring the use of tools, that is to say, by mere relative longitudinal or axial movement of the parts, accompanied, if necessary, by a slight angular movement in the direction opposite to that in which power is transmitted between said parts, for the purpose of releasing the gripping devices.

If desired, and as shown in Fig. 2, the mandrel above described may be operatively connected with the lathe by means of the usual lathe dog 29 instead of by means of the chuck 27, in which case said lathe dog may be passed over the reduced terminal 14 at the driven end of the mandrel, the dog set screw 30 being engaged with the corresponding flattened portion 16, and the head center 31 of the lathe being engaged with the socket 15. It will be understood that in either case, the tail center 32 of the lathe will be engaged with the socket 15 at the driving end of the mandrel.

From the foregoing it wil be seen that the work on the driving end of the mandrel is rotated by said mandrel through engagement of the rollers 18 with the interior of the work, so that, as thus far explained, the interior diameter of said work must approximately equal the exterior diameter of the mandrel body 10. In accordance with an important object of the invention, provision is made for adapting the same mandrel to use with different pieces of work of different internal diameters. To this end there may be provided a series of interchangeable sleeves 33 (see Fig. 7) each of an internal diameter corresponding to the external diameter of the mandel body but differing in thickness, and consequently in external diameter, throughout the series, said sleeves being each rendered expansible by a longitudinal slot 34 and, in the case of the thicker sleeves of the series, by additional weakening grooves, 35. These sleeves may, of course, be of any desired number, four being shown by way of illustration, and may differ in thickness by any desired amount. In applying to the mandrel a piece of work of an internal diameter materially greater than the external diameter of the mandrel body, there is disposed between said work and the mandrel body that sleeve of the series which most closely approximates in external diameter the internal diameter of the work. When, therefore, the mandrel is rotated, the rollers 18, bearing outwardly against the interior of the sleeve 33 which surrounds them, will tend to expand said sleeve and force the same into close engagement with the interior of the work, so as to provide a driving fit. Where weakening grooves 35 are employed, said grooves are preferably disposed about each sleeve at substantially equal distances from each other and from the corresponding slot 34. Also, as shown in the case of the slot 34 in Fig. 3, said grooves and slots are preferably of slightly helical form in order that the work may be engaged by the sleeve throughout a complete circle.

It will be seen that by the provision of a plurality of gripping rollers in each series (the rollers in each series being at least three in number), said rollers will serve, not only as a driving connection between the chuck and the mandrel and between the mandrel and the work, but, by reason of the equal outward thrust of all of the rollers in each series, said rollers will serve also accurately to center the mandrel in the chuck and as accurately to center the work on the mandrel, so that it has been found in practice that, by the use of a mandrel of the character described, cylindrical bodies having relatively thin walls may be turned with greater accuracy than by any means heretofore in use.

Having thus described my invention, I claim:

1. A work-holding mandrel having driven and driving portions, said portions being provided with means for automatically forming driving connections respectively with a machine driving element and with a piece of work to be driven.

2. A work-holding mandrel having driven and driving portions provided respectively with oppositely acting automatic gripping members.

3. A work-holding mandrel having driven and driving portions provided with longitudinal grooves, rollers in said grooves, and springs for forcing the rollers of the driven and driving portions respectively into engagement with opposite sides of their respective grooves.

4. A work-holding mandrel having driven and driving portions and having a continuous longitudinal groove common to both of said portions, and oppositely acting automatic gripping members located respectively in the portions of said groove formed in the several portions of said member.

5. A work-holding mandrel having driven and driving portions and having a continuous longitudinal groove common to both of said portions and of equal depth at both sides, rollers located respectively in the portions of said groove formed in the several portions of said member, and springs for forcing said rollers respectively into engagement with opposite sides of their respective groove portions.

6. A work-holding mandrel having driven and driving portions, a collar between said portions, and a continuous longitudinal groove common to both of said portions and extending under said collar, and oppositely acting automatic gripping rollers located respectively in the portions of said groove formed in the several portions of said member, and having end portions engaged by said collar to retain said rollers in place.

7. A work-holding mandrel having driven and driving portions and a continuous longitudinal groove common to both of said portions, rollers located respectively in the portions of said groove formed in the several portions of said member, and a continuous spring in said groove having portions for forcing said rollers respectively into engagement with opposite sides of their respective groove portions.

8. A work-holding mandrel having driven and driving portions provided with means for forming driving connections respectively with a machine driving member and with a piece of work to be driven, said means being adapted also to center said mandrel in said driving member and to center said work on said mandrel.

9. A work-holding mandrel having driven and driving portions provided with rectangular longitudinal grooves, rollers in said grooves, and springs for forcing the rollers of the driven and driving portions, respectively, into engagement with opposite sides of their respective grooves.

10. A work holding mandrel having in combination a mandrel body adapted to be inserted in hollow work and to be rotated in a predetermined direction to drive the work, a surface carried by said body and inclined outwardly from its forward to its rearward side, a work gripping roller carried by said body and arranged to engage said surface and means for yieldinglv forcing said roller relatively to said surface in a direction reverse to the operative direction of rotation of the mandrel body to grip the work.

11. A work holding mandrel having in combination a mandrel body constructed for insertion in hollow work and arranged to be rotated in a predetermined direction to drive work mounted thereon, a series of inclined surfaces carried by said body and substantially equally spaced about said body, a series of work gripping rollers arranged respectively to engage said surfaces and individual actuating springs for each roller tending to force said rollers in a direction relatively to said surfaces reverse to the work driving direction of rotation of said body to grip the work.

12. A work holding mandrel having in combination a mandrel body adapted to be inserted in hollow work and to be rotated in a predetermined direction to drive the work, a groove formed in said body having an inner face inclined outwardly from the forward to the rearward side of the groove, a work gripping roller mounted in the groove and a spring mounted in the groove behind the roller and arranged to force the roller relatively to said groove in a direction reverse to the operative direction of rotation of the mandrel body to grip the work.

13. A work gripping mandrel having in combination a mandrel body, a groove formed in said body, a work gripping roller mounted in the groove and a leaf spring mounted in the groove behind the roller and arranged to force the roller in a direction relatively to said groove to grip the work and means secured to the body and extending over the outer end of the spring for holding the spring in place in the groove.

14. A work gripping mandrel having in combination a mandrel body adapted to be inserted in hollow work and to be rotated in a predetermined direction to drive the work, a groove formed in said body having an inner wall inclined outwardly from the forward to the rearward side of the groove, a work gripping roller mounted in the groove and a bent leaf spring mounted in the groove behind the roller and arranged to force the roller relatively to the groove in a direction reverse to the operative direction of rotation of the mandrel body to grip the work.

15. A work holding mandrel having in combination a mandrel body, an inclined surface carried by said body, a work gripping roller carried by said body and arranged to engage said surface, means secured to the body and extending over the outer ends of the roller for holding the roller in place with relation to the mandrel body.

16. A work holding mandrel having in combination a mandrel body, a groove formed in said body, a work gripping roller mounted in the groove, and means for holding a roller in the groove comprising a removable cap secured to the mandrel body and having a flange arranged to extend over the outer end of the roller.

17. A work holding mandrel having in combination a mandrel body, a groove formed in said body, a work gripping roller mounted in the groove, a leaf spring mounted in the groove behind the roller and arranged to force the roller relatively to the groove in a direction to grip the work, and means carried by said body and extending over the ends of the roller and spring to hold the roller and spring in position in the groove.

18. A work gripping mandrel having in combination a mandrel body, a series of grooves formed in said body, a work gripping roller mounted in each of said grooves, a leaf spring mounted in each of said grooves behind the corresponding roller and arranged to force the roller in a direction relatively to said groove to grip the work, and caps mounted on the mandrel body and extending over the ends of the springs and rollers to hold the same in position in the grooves.

Signed at Norge, in the county of James City and State of Virginia, this 8th day of July, 1921.

ELMER O. GOORDMAN.